(12) United States Patent
Carlson

(10) Patent No.: US 6,270,048 B1
(45) Date of Patent: Aug. 7, 2001

(54) SUPPORT HOOK FOR USE WITH VEHICLES

(76) Inventor: Alfred J. Carlson, 2103 W. Georgia, Phoenix, AZ (US) 85015

(*) Notice: Subject to any disclaimer, the term of this patent is extended or adjusted under 35 U.S.C. 154(b) by 0 days.

(21) Appl. No.: 09/266,502

(22) Filed: Mar. 12, 1999

(51) Int. Cl.[7] .................................................. B60R 9/058
(52) U.S. Cl. ........................ 248/339; 248/304; 224/560
(58) Field of Search .................................. 248/339, 304, 248/340, 303, 215; 224/329, 322, 560, 318, 268, 324; 254/124, 131

(56) References Cited

U.S. PATENT DOCUMENTS

| | | | |
|---|---|---|---|
| 1,269,952 | * 6/1918 | Mountain | 29/220 |
| 2,025,761 | * 12/1935 | McCann | 62/300 |
| 2,064,133 | * 12/1936 | Von Schroeder | 248/214 |
| 3,240,463 | * 3/1966 | Cook | 248/303 |
| 3,630,475 | * 12/1971 | Barry | 248/205 |
| 4,372,450 | * 2/1983 | Licari et al. | 248/304 |
| 5,007,609 | * 4/1991 | Bredovskis | 248/303 |
| 5,174,536 | * 12/1992 | Pelletier et al. | 248/339 |
| 5,553,823 | * 9/1996 | Protz, Jr. | 248/339 |
| 5,676,284 | * 10/1997 | Schenberg | 223/1 |
| 5,979,852 | * 11/1999 | Levesque | 248/339 |

* cited by examiner

Primary Examiner—Ramon O. Ramirez
Assistant Examiner—Jon Szumny
(74) Attorney, Agent, or Firm—The Halvorson Law Firm (57) ABSTRACT

A lifting device useful for loading heavy and bulky objects into a motor vehicle, such as a van or sport utility vehicle. The device comprises a weight support structure having a weight transfer foot that is adapted to removably attach to a roof section of a motor vehicle, such as the rain gutters commonly provided on vans and sport utility vehicles. A hook structure is fixedly attached to the weight transfer foot, by methods common in the industry, such as welding. When the weight transfer foot is attached to the roof section of a motor vehicle the hook structure hangs down below the roof and is available for supporting the heavy object. Ropes attached to the heavy object may then be removably attached to the hook structure, allowing the heavy object to be levered up and into the vehicle.

4 Claims, 8 Drawing Sheets

SUPPORT HOOK FOR USE WITH VEHICLES

FIELD OF THE INVENTION

The present invention relates to the field of support devices for use with motor vehicles. More specifically, the present invention relates to a support hook device that is adapted to attach to a motor vehicle's exterior and to assist a person with loading and unloading of heavy articles into the motor vehicle.

BACKGROUND

It has long been known that the loading and unloading of heavy articles into and out of motor vehicle is a dangerous task. This is primarily due to the unbalanced stance a person must use when lifting heavy or bulky objects. When holding a heavy object in one's arms, a great stress or strain is placed upon the back, especially the lower back. Frequently this results in injury to the lower back.

Also, older or weaker individuals are at a decided disadvantage in loading and unloading heavy objects from motor vehicles. Often, they are unable to accomplish the task without the assistance of another individual. However, convenient helpers are not always available. These individuals then will usually attempt to load or unload the heavy article.

One solution to this problem has been to attach complex and expensive lift devices to the motor vehicle. This option, while attractive to commercial business, is not always feasible to the ordinary individual. Therefore there is a need for inexpensive, easy to use devices that are operable by individuals.

SUMMARY OF THE INVENTION

It is an object of the present invention to provide a device that allows users to easily and efficiently hoist large and heavy objects into a motor vehicle, such as a van.

It is another object of the present invention to provide a device for loading objects into motor vehicles comprising a weight transfer foot that is adapted to removably attach to a roof section of a motor vehicle and a hook structure fixedly attached to the weight transfer foot, wherein when the weight transfer foot is attached to the roof section of a motor vehicle the hook structure hangs down below the roof and is available for supporting a heavy object.

It is a further object of the present invention to provide a device as describe above that has a weight transfer foot that is adapted to fit within rain gutters of the roof section of the van.

It is still another object of the present invention to provide a hook structure for the device that is substantially S-shaped and having one end of the S-shape attached to the weight transfer foot.

It is still a further object of the present invention to provide an alternate hook structure for the device that is substantially C-shaped and having one end of the C-shape attached to the weight transfer foot.

Further objects of the present invention are disclosed and described below in the drawings and the description of the preferred embodiments.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

DESCRIPTION OF PREFERRED EMBODIMENTS

The present invention is a device 1 that is useful for loading heavy and bulky objects into a motor vehicle, such as a van or sport utility vehicle.

Figure 1:
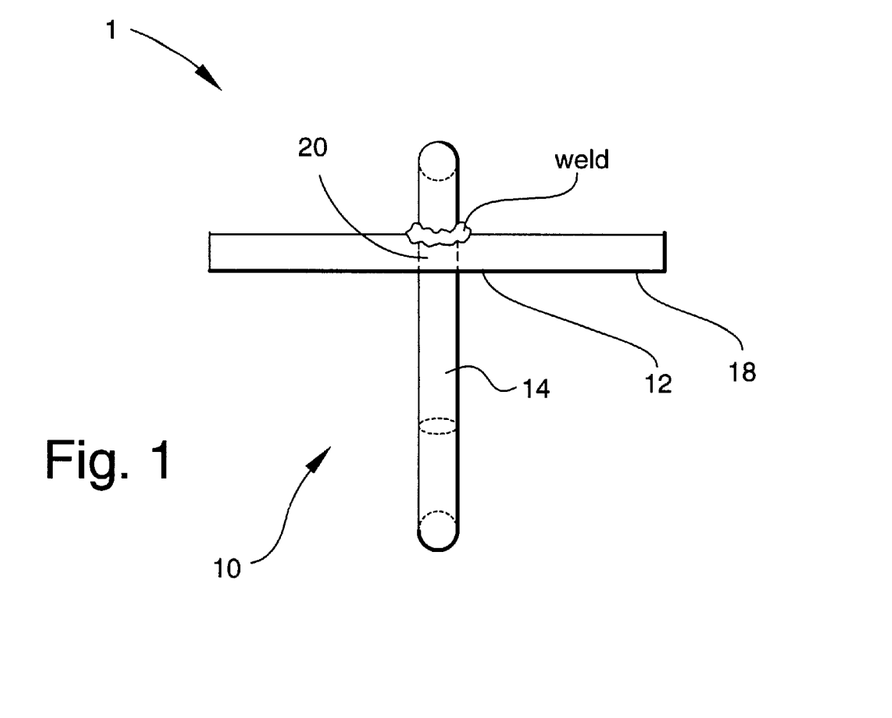
FIG. 1 is a front view of one of the weight support embodiments of the present invention.

The present invention is a device 1 for loading objects into motor vehicles. In one embodiment, the device 1 comprises a weight support structure 10 having a weight transfer foot 12 that is adapted to removably attach to a roof section of a motor vehicle, such as the rain gutters commonly provided on vans and sport utility vehicles. A hook structure 14 is fixedly attached to the weight transfer foot 12, by methods common in the industry, such as welding and the like. When the weight transfer foot 12 is attached to the roof section of a motor vehicle the hook structure 14 hangs down below the roof and is available for supporting the heavy object. Chains or cables 16 attached to the heavy object may then be removably attached to the hook structure 14, allowing the heavy object to be levered up and into the vehicle.

More specifically, it is preferred that the weight transfer foot 12 further comprises a rod 18 that is adapted to fit with rain gutters of the roof section of motor vehicle. The rod 18 reduces the pressure (force divided by area) on the roof by spreading the force caused by the weight of the object to be distributed along a significant portion of the roof. This, then, allows heavier objects to be loaded into the motor vehicle. Additionally, it is preferred that the rod 18 that comprises the weight transfer foot 12 should have a slight arcuate shape that is concave down when the device is used on the motor vehicle. This arcuate shape, coupled with the inherent flexibility of the materials from which the rod 18 is manufactured, provides the weight support structure 10 with a slight cushioning resiliency, similar to a leaf spring.

Figure 2:
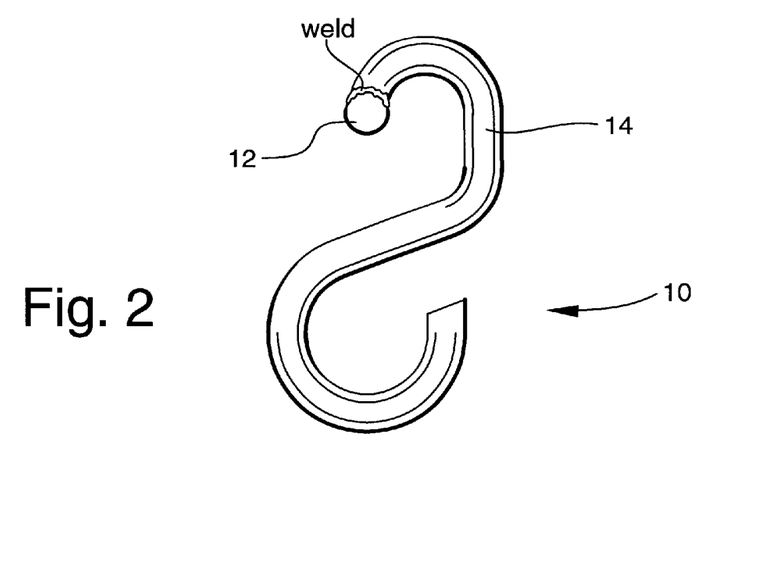
FIG. 2 is a side view of the weight support illustrated in FIG. 1, clearly illustrating an S-shaped hook structure.

Furthermore, it is preferred that the hook structure 14 further comprises an S-shaped hook structure 14, illustrated in FIG. 2, that is attached, by means common in the industry, to the weight transfer foot 12. The S-shaped hook structure 14, when attached to the weight transfer foot 12, is attached substantially perpendicular to the rod 18 of the weight transfer foot 12, and, when used on the motor vehicle, hangs down below the roof structure of the motor vehicle. While it is preferred that the hook structure 14 be attached around a middle portion 20 of the weight transfer foot 12, it is also within the scope of the present invention to attach the hook structure 14 to either end of the weight transfer foot 12.

Figures 3, 4:
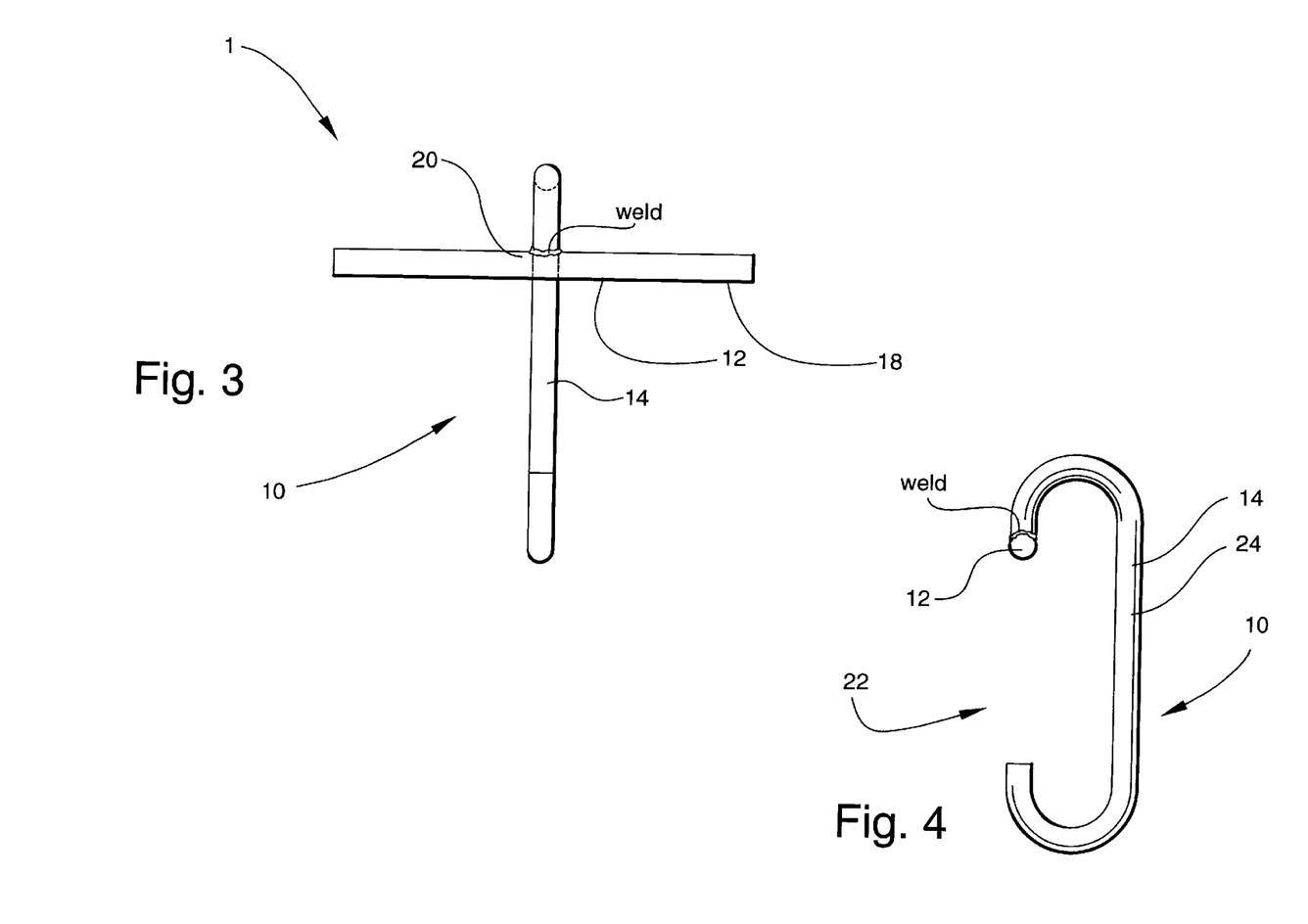
FIG. 3 is a front view of another weight support embodiment of the present invention.
FIG. 4 is a side view of the weight support illustrated in FIG. 3, clearly illustrating a C-hook shaped hook structure.

In another embodiment of the device of the present invention, the hook structure 14 may be C-shaped, as illustrated in FIG. 4, with one end of the C-shaped hook structure 14 attached in a generally perpendicular orientation to the weight transfer foot 12 by means common in the industry. In this embodiment, the open mouth part 22 of the C-shape would be oriented inward, toward the interior of the van, thereby minimizing or eliminating any damage to the roof structure that could be caused by the solid back portion 24 of the C-shaped hook structure 14.

Figure 5:
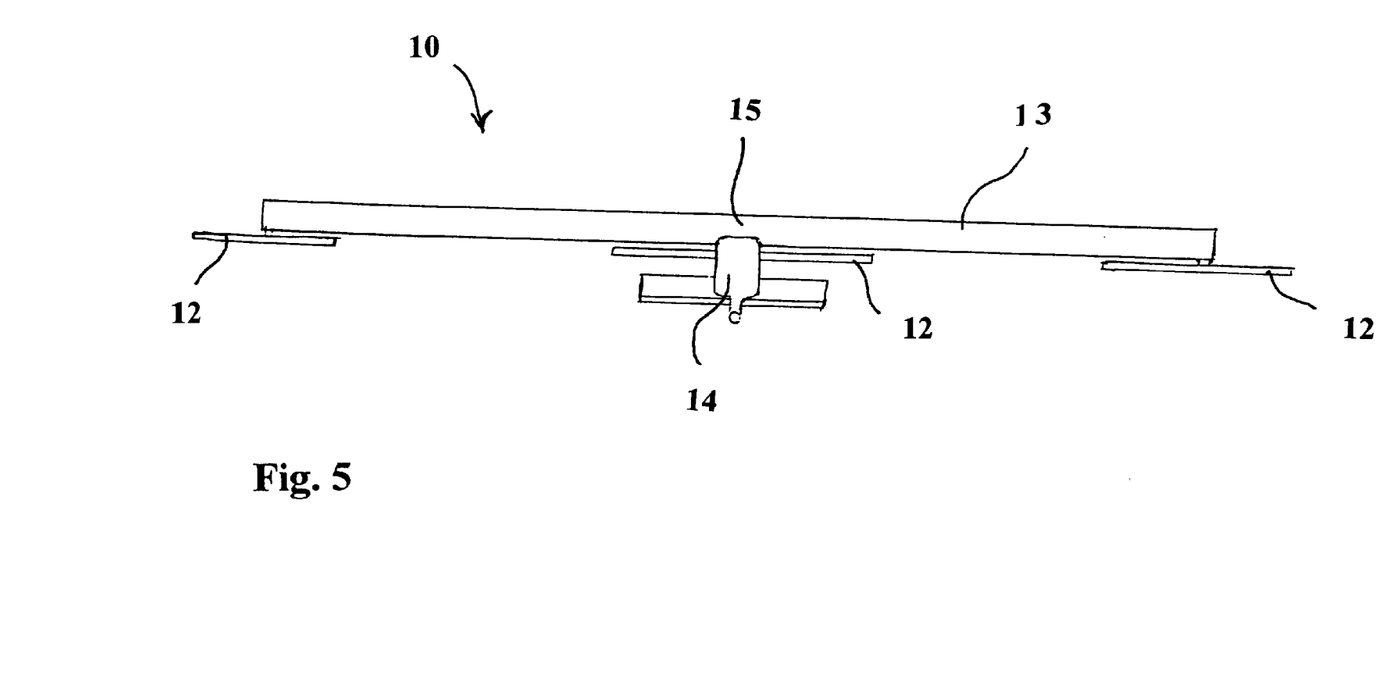
FIG. 5 is yet another embodiment of the weight support according to the present invention having three weight transfer foot structures to further spread any load supported by the device.

Finally, there is at least a third embodiment of the weight supporting structure 10 that has at least two, but preferably three, weight transfer feet 12. These feet 10 are attached to a support bar 13, preferably with one foot 12 at each end of the support bar 13. If at least a third foot 12 is attached, it, or they, should be attached symmetrically between the two end feet 12, e.g., a third foot 12 would be attached to a middle portion 15 of the support bar 13. The hook structure 14 is also, as described above for attachment to a weight transfer foot 12, attached to the middle of the support bar 13.

Figure 11:
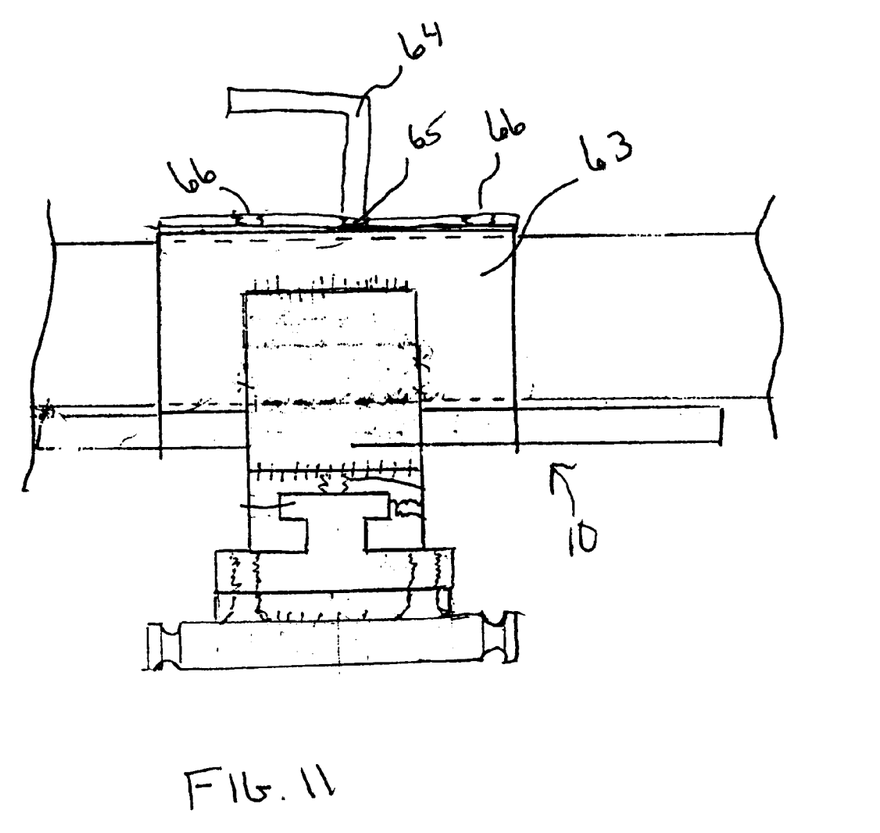
FIG. 11 shows a positioning locking mechanism according to the present invention.

As shown in FIG. 11, in an alternate embodiment, there is a position locking mechanism attached to the third foot 12 that comprises a middle piece outer housing 63 through which the support bar 13 extends. The outer housing 63 is slightly larger than the cross section of the support bar 13 and a gib, or locking tang 67, is placed between the inner surface of the outer housing 63 and the support bar 13 in a position above the support bar 13. There is a locking screw 64 that is threadingly received by an aperture 65 in the top of the outer housing 63 and when screwed into the outer housing 63, presses onto the gib thereby locking the position of the outer housing 63 relative to the support bar 13. Finally, at opposite ends of the outer housing 63 are locking set screws 66, or gib retaining screws, that are received by complementary apertures and are used to more securely lock, or set, the position of the outer housing 63.

Figure 10:
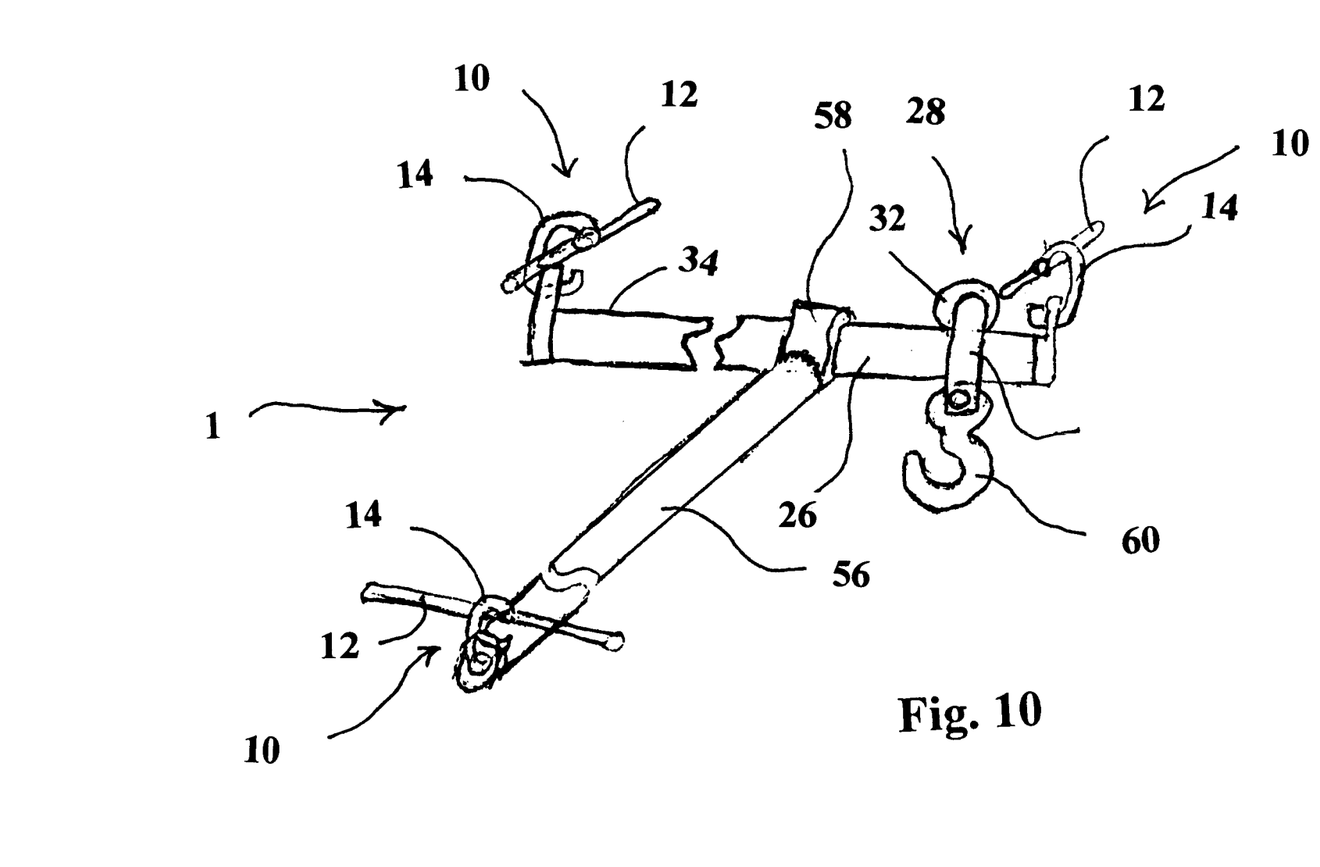
FIG. 10 shows an embodiment of the weight support according to the present invention having a cross-bar that extends between a pair of weight transfer feet and a perpendicular support that extends from a third weight transfer foot to a middle section of the cross-bar.

Also, according to the present invention, the device 10 for loading objects into motor vehicles may also comprise a pair of weight transfer structures 10 that are adapted to removably attach to opposite sides of a roof section of a motor vehicle. A load positioning bar 26, or cross-bar, removably attaches to and extends, within the interior of the motor vehicle, between the pair of weight support structures 10. Further, there is a weight lifting structure 28 attached to the load positioning bar 26 and is adapted to incrementally lift and position heavy objects into the motor vehicle.

Figure 6:
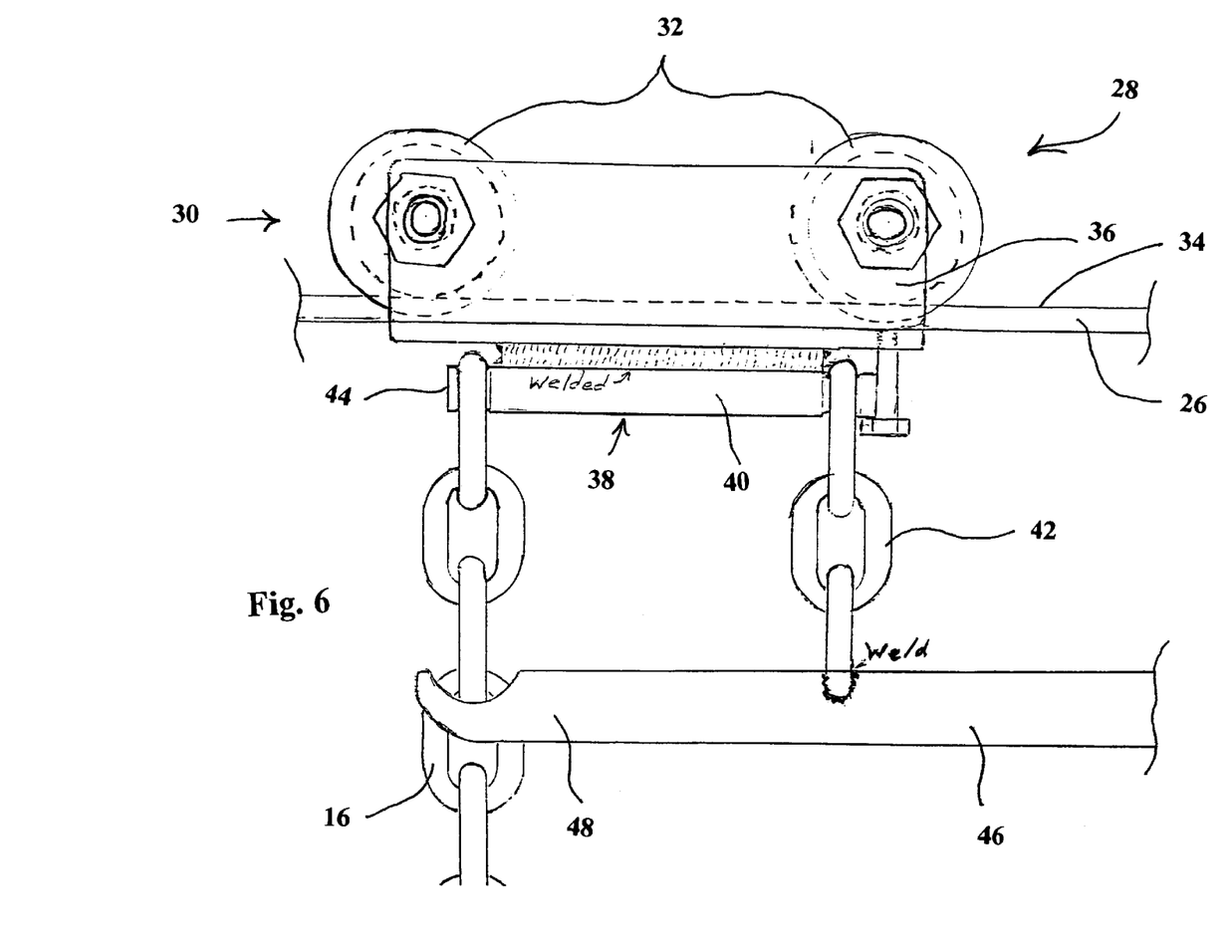
FIG. 6 is an illustration of a side view of a load supporting structure, according to the present invention.

In one embodiment, the weight lifting structure 28 of the above embodiment has a wheeled positioning section 30 that includes at least one roller 32, or wheels, preferably two, which are capable of traveling along a top side 34 of the load positioning bar 26. Rotatingly attached to the at least two rollers 32 are two side portions 36 that extend below the load positioning bar 26 and are connected to a lifting subunit 38. It is envisioned that a worm type gearing system could work with the positioning section 30 and also be included into the weight transfer structure 10. The work type gearing system would be attached to the load positioning bar 26. Rotation of the worm gear would work to move the weight lifting structure 28 from one side of the motor vehicle to another.

The lifting subunit 38 further has a solid bar 40 that attaches to the two side portions 36 of the weight lifting structure 28, a load securing chain 16 that is adapted to be removably attached to one end of the solid bar 40, such as by threading a chain receiving structure 44 through one of the links of the chain 16, and a lever 46 that is pivotally attached by a fulcrum load securing chain 42 to an opposite end of the solid top bar 40 and is adapted to incrementally lift segments of the load securing load securing chain 16, and thereby a heavy object that is secured to the load securing chain 16.

Thus, when an object is secured to by the load securing load securing chain 16, the load securing chain 16 is extended and removably attached to the weight lifting structure 28. A proximate end 48 of the lever 46 is inserted into a link in the load securing chain 16 that is between the weight lifting structure 28 and the heavy object. Downward force is applied to a distal end 50 of the lever 46, thereby levering the proximate end 48 upward. The load securing chain 16 is then removed from the weight lifting structure 28, slack in the load securing chain 16 between the proximate end 48 of the lever 46 and the weight lifting structure 28 is removed, and the load securing chain 16 is reattached to the weight lifting structure 28. This process is repeated until the heavy object is at a sufficient height to be conveniently moved into the motor vehicle.

Figure 7:
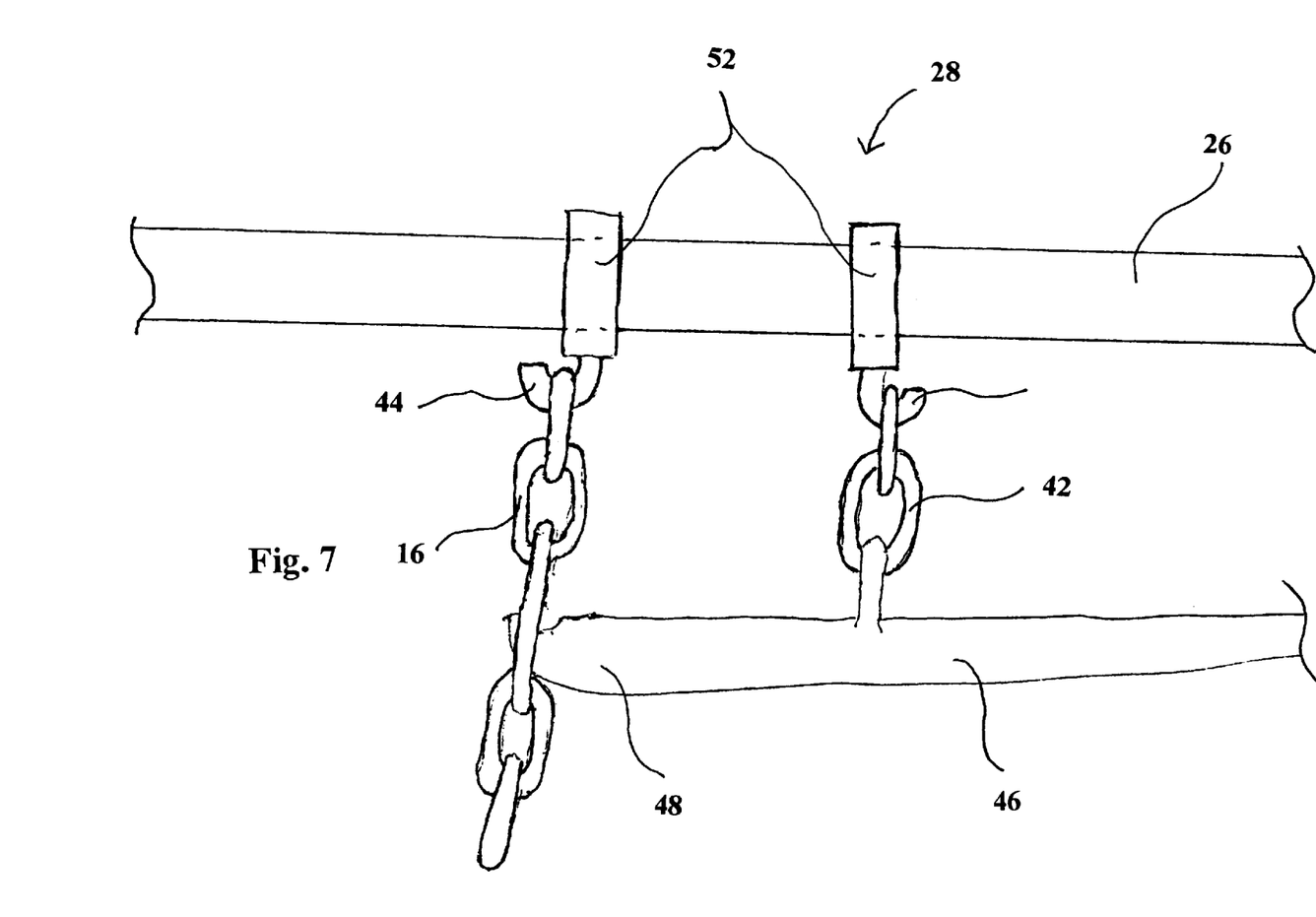
FIG. 7 illustrates a side view of an alternate embodiment of a load supporting structure, according to the present invention.

Another embodiment of the present invention, as illustrated in FIG. 7, heavy objects may be lifted into a motor vehicle by attaching a pair of movable collars 52 onto the cross-bar 26. One of the pair of movable collars 52 adjustably attaches to the lever 46 by the fulcrum chain 42. The remaining collar of the pair of movable collars 52 removably receives the load securing chain 16.

Figure 8:
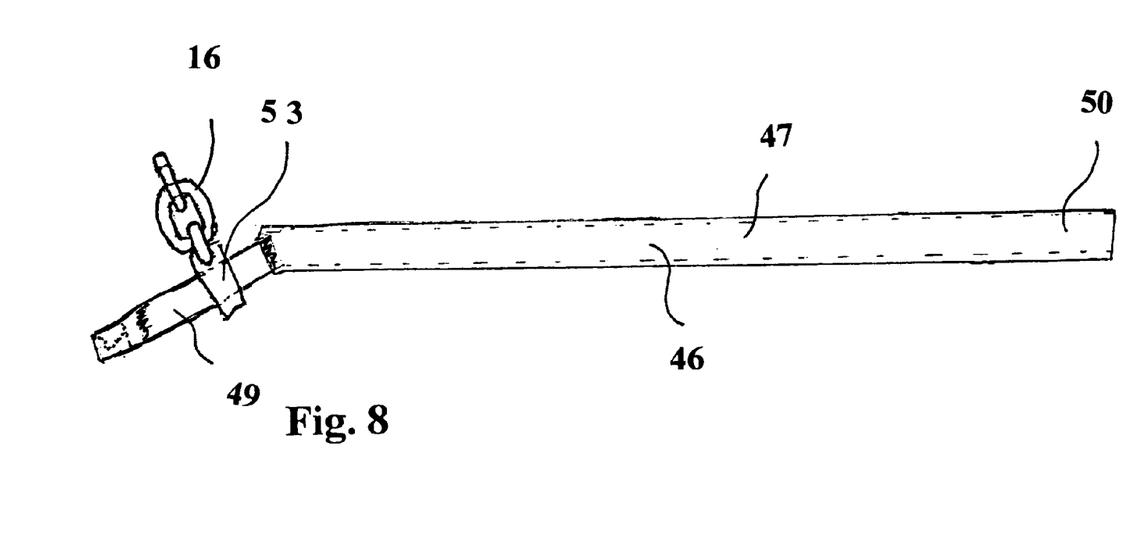
FIG. 8 shows a side view of an alternate form of lever contemplated by the present invention.

In another embodiment of the lever 46, the lever 46 may be made from two pieces, a handle piece 47, and a lifting piece 49. The lifting piece 49 is attached to the handle piece 47 with an angle between the two pieces. This angle allows for more comfortable use of the lever. Further, the lifting piece 49 is adjustingly attached to the fulcrum chain 42 by a fulcrum collar 53. Thus, the pivot point of a fulcrum embodied by the present device is adjustable.

Figure 9:
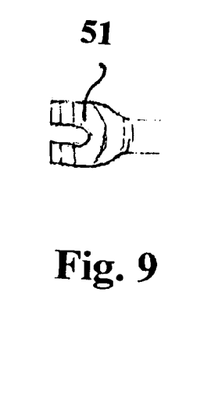
FIG. 9 is a tip view of the proximate end of the alternate form of lever illustrated in FIG. 8.

Thus, when the lifting piece 49 engages the load securing chain 16, the handle piece 47 is at a more horizontal position and is therefore easier to push down and lift heavy objects. Additionally, the lifting piece 49 has a substantially U-shaped engaging structure 51, as illustrated in FIG. 9. Thus, the U-shape of the engaging structure 51 is adapted to securely, and removably, engage a link in the load securing chain 16.

Finally, in yet another embodiment, there may be a perpendicular support 56 that substantially perpendicularly extends from a third weight support structure 10 that is receive, or attached, to a rear end of the motor vehicle, to a middle portion 58 of the cross-bar 26. This perpendicular support 56 may be used either as a weight support, or, alternately, as another direction from which heavy objects may be loaded into the motor vehicle.

In an alternate embodiment of the weight support structure 10 adapted for use with the above embodiment, the weight support structure 10 may have a single roller 32 that rollingly attaches to one end of the two side structures 36. The other end of the two side structures 36 is pivotally attached to a hook 60, preferably J-shaped.

When using the perpendicular support 56 as a loading means, the weight lifting structure 28 should be moveable attached to the perpendicular support 56, instead of the cross-bar 26.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A device for loading objects into motor vehicles comprising a weight transfer foot that is adapted to removably attach to a roof section of a motor vehicle and a hook structure fixedly attached perpendicularly to the weight transfer foot, wherein the weight transfer foot has a slight arcuate shape that is concave down when the device is on the motor vehicle providing a cushioning resistance for the device, whereby when the weight transfer foot is attached to the roof section of a motor vehicle the hook structure hangs down below the roof and is available for supporting a heavy object, said weight transfer foot is adapted to be positioned such that it is aligned with and parallel to the longitudinal direction of the roof section to which it is removably attached rather than perpendicular to the roof section, in combination with a rope that is adapted to be attached to a heavy object, said rope removably attached to the hook structure and adapted to allow the heavy object to be levered up and into the vehicle.

2. The device as in claim 1 wherein the weight transfer foot further comprises a rod that is adapted to fit within rain gutters of the roof section of motor vehicle.

3. The device as in claim 2 wherein the hook structure further comprises a substantial S-shape and one end of the S-shape is attached to the weight transfer foot and the S-shape is substantially perpendicular to the rod of the weight transfer foot.

4. The device as in claim 2 wherein the hook structure further comprises a substantial C-shape and one end of the C-shape is attached to the weight transfer foot and the C-shape is substantially perpendicular to the rod of the weight transfer foot.

* * * * *